United States Patent
Clatanoff et al.

(10) Patent No.: US 6,839,494 B2
(45) Date of Patent: Jan. 4, 2005

(54) DUAL STAGE FIBER OPTIC CABLE DESIGN

(75) Inventors: William J. Clatanoff, Austin, TX (US); Larry R. Cox, Austin, TX (US); Harry A. Loder, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/391,280

(22) Filed: Mar. 18, 2003

(65) Prior Publication Data

US 2004/0184748 A1 Sep. 23, 2004

(51) Int. Cl.⁷ .................................................. G02B 6/44
(52) U.S. Cl. ........................................................ 385/113
(58) Field of Search ................................ 385/100, 106, 385/109, 113, 114

(56) References Cited

U.S. PATENT DOCUMENTS

| | | |
|---|---|---|
| 4,172,106 A | 10/1979 | Lewis |
| 4,389,087 A | 6/1983 | Bendayan |
| 4,595,793 A | 6/1986 | Arroyo |
| 4,740,053 A | 4/1988 | Cassidy |
| 4,781,433 A | 11/1988 | Arroyo |
| 5,189,721 A | 2/1993 | Sayegh |
| 5,561,731 A | 10/1996 | Cooke |
| 6,061,488 A | 5/2000 | Lhuillier |
| 6,259,844 B1 * | 7/2001 | Logan et al. ............... 385/113 |
| 6,516,126 B1 | 2/2003 | Rous |
| 6,519,399 B2 * | 2/2003 | Strong et al. ............... 385/114 |
| 6,621,966 B2 * | 9/2003 | Lail ........................... 385/114 |
| 6,658,187 B2 * | 12/2003 | Militaru ...................... 385/112 |

FOREIGN PATENT DOCUMENTS

EP 1031864 A1 12/1999

* cited by examiner

Primary Examiner—Thanh-Tam Le
(74) Attorney, Agent, or Firm—Yen Tong Florczak

(57) ABSTRACT

A fiber optic cable has one or more optical fibers, an inner tube surrounding the optical fibers, a strength member, an inner jacket surrounding the inner tube and strength member, and an outer jacket surrounding the inner jacket without being adhered to the inner jacket such that the outer jacket is easily strippable from the inner jacket. The inner jacket is constructed of a flexible, flame resistant material such as braided glass fibers, while the outer jacket may be constructed of a stiffer, flame retardant material such as polyvinyl chloride.

40 Claims, 2 Drawing Sheets

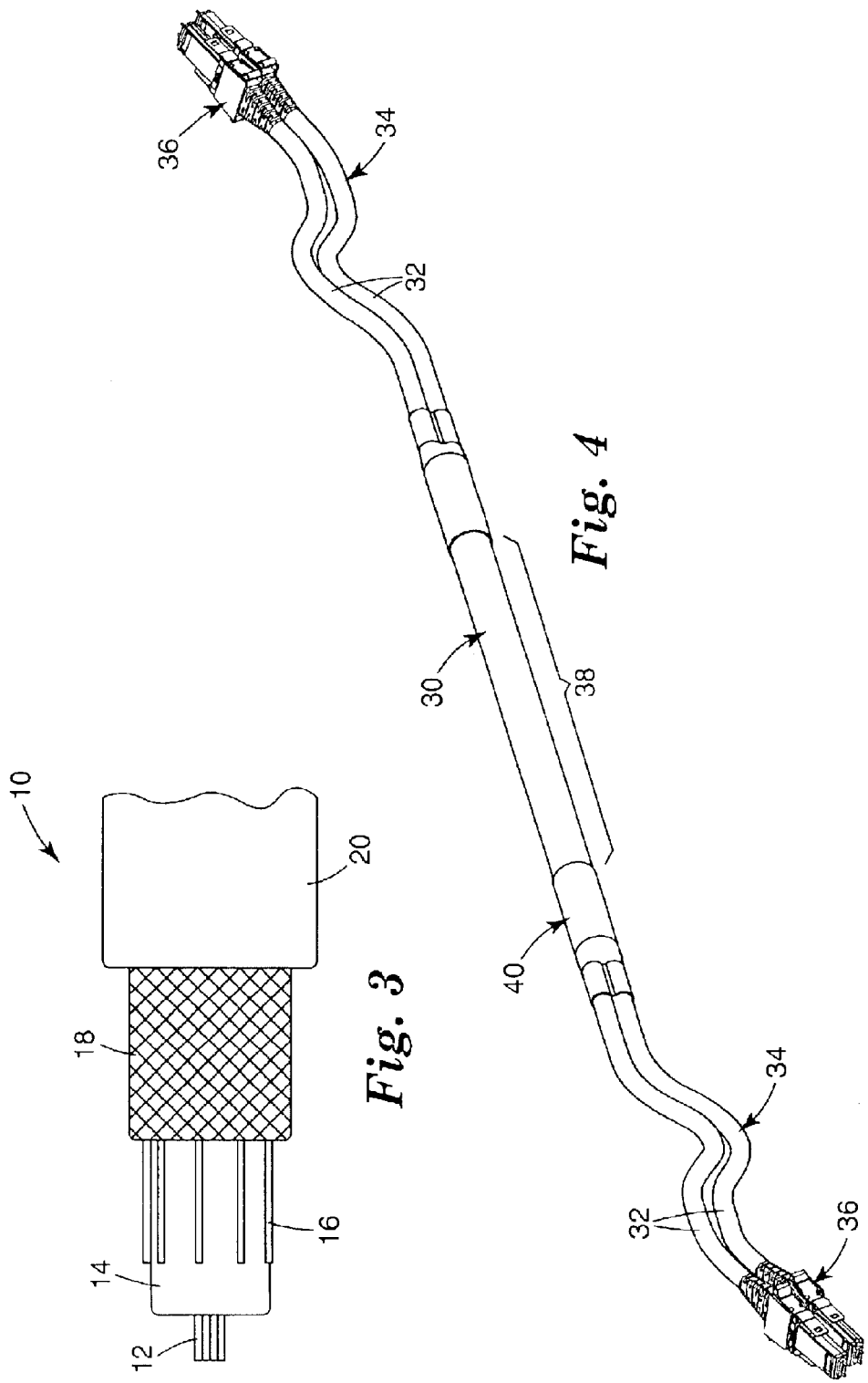

DUAL STAGE FIBER OPTIC CABLE DESIGN

FIELD OF THE INVENTION

The present invention generally relates to fiber optic cabling, and more particularly to improved fiber optic cables designed to ease routing and installation while conforming to applicable safety standards such as flame retardancy, and to novel methods of constructing and installing such fiber optic cables.

BACKGROUND

In recent years, in certain applications optical fibers have become the preferred medium over copper wire for telecommunications, particularly high speed communication and data transmission. There are already millions of miles of optical fiber in use today, for both long distance hauls, and local distribution within a facility or building. Field installation, service and repair of optical fiber systems can be a delicate, time consuming and often troublesome procedure due to the fragile nature of the components involved, especially the optical fiber itself. Optical fibers are typically made of a material such as quartz, multi-component glass or synthetic resins and in view of their generally small diameter, such fibers are susceptible to high stresses when undergoing a force exerted in a direction at right angles to the fiber axis. For example, optical fibers made of quartz or multi-component glass are liable to break, and those made of synthetic resins are liable to bend or break under such a force. Even a slight bend (microbend) in an optical fiber can result in serious light leakage and consequent signal loss, and small deformations can induce fractures which over time propagate into large cracks.

A composite fiber optic cable typically includes an outer jacket, an inner buffer and a central or axial clad optical fiber or fibers. The outer jacket and the inner buffer are usually fabricated of flexible, tubular plastic material. Strength members, such as elongated strands of aramid fibers (e.g., KEVLAR), may be incorporated between the outer jacket and the inner buffer to protect the fiber and provide longitudinal strength for the cable while permitting easy manual manipulation of the cable itself. A single fiber optic cable can carry multiple fiber optic cores, or multi-fiber ribbons.

In order to terminate an optical fiber or to assemble the cable/fiber in a connector or splice, the outer jacket and inner buffer normally are removed to expose a length of the small brittle optical fiber therein. In terminating such a fiber within an optical fiber connector, for example, the connector often includes a ferrule, such as ceramic material, having a small center bore through which the fiber extends and barely protrudes from a distal end thereof for connection or mating with the fiber of a complementary connector.

There is a wide range of cable designs and methods of manufacture which provide various constructions of the outer jacket and inner tubing. In U.S. Pat. No. 4,172,106, the cable has a protective sheath that surrounds an optical fiber core having one or more optical fiber waveguides. The protective sheath consists of a plastic tube incorporating reinforcing tensile material in its wall, such as steel wires embedded in the sheath wall. The sheath is formed in a single continuous extrusion step.

U.S. Pat. No. 4,389,087 describes an optical fiber cable design that imparts mechanical protection and reinforcement. The optical fiber core is surrounded by two concentric (inner and outer) coverings. The inner covering is formed by extruding about the core a material having a high modulus of elasticity, such as a polyamide, polyethylene terephthalate, or a high density polyethylene. The outer covering, also made via extrusion, is formed of a material having a low modulus of elasticity, such as low-density polyethylene, polyvinyl chloride, or an ethylene and vinyl acetate copolymer. A mechanical supporting element in the form of a cord is disposed along the optical fiber between the inner and outer coverings.

U.S. Pat. No. 4,595,793 describes a flame-resistant plenum cable that may be used for a single optical fiber core or for a core having multiple fiber ribbons. The core is surrounded first by a fire-retardant plastic jacket. The plastic jacket is further surrounded by a sheath system having an inner layer of heat-resistant fibrous material. This inner layer is enclosed by a woven glass layer that is impregnated with a fluorocarbon resin. The outermost layer is a fluoropolymer plastic jacket. A similar design is seen in U.S. Pat. No. 4,605,818.

In U.S. Pat. No. 4,740,053, a cable for optical fibers comprises a compound sheath having inner and outer layers. The inner layer is high modulus and density, while the outer layer is low density. Both layers are formed by extrusion. The outer layer is constructed of foamed polyethylene, and the inner layer is constructed of polypropylene.

U.S. Pat. No. 4,781,433 shows another optical fiber plenum cable having a core that may include a plurality of buffer-coated optical fibers. The optical fibers are individually or collectively enclosed in a fibrous strength member. An outer jacket is provided over the strength member, comprising a plastic material with resistance to flame spread and smoke evolution.

U.S. Pat. No. 5,189,721 depicts an optical fiber ribbon cable with a series of clad optical fibers aligned in a row. The optical fibers are surrounded by a layer of porous expanded polytetrafluoroethylene tape that has coatings of adhesive on both sides. Applied over the double-coated tape is another tape made of polyester and coated again with adhesive on at least its inner side adjacent the first tape. The polyester tape is surrounded by a braided sheath of aramid fibers. A binder ribbon is then wrapped around the braided sheath. The cable is completed by extruding an outer jacket of flame-retardant polyvinyl chloride.

U.S. Pat. No. 5,561,731 describes a flexible casing for optical fiber ribbons which is rectangular in cross-section. The casing has an inner tube made of low friction material, and an outer tube made of polyvinyl chloride, with flexible tensile fibers located between the inner and outer tubes.

U.S. Pat. No. 6,061,488 describes a fiber optic cable adapted for more difficult environments. A single optical fiber or a bundle of optical fibers extend inside a metal tube. A braided ceramic sheath is interposed between the fiber(s) and the metal tube. The metal tube serves to hold the fibers in place by compressing the sheath.

In European Patent No. 1,031,864, a data transmission cable has a core element enclosed by an extruded polymer sheath consisting of two or more polymers with low adhesion to one another. One layer is exclusively or predominantly made of one particular polymer, and another layer is made of a mixture of the polymers. The sheath provides a mechanically strong exterior and a flame-resistant interior, while being easy to strip from the cable.

While there are accordingly many different designs for fiber optic cable constructions, these constructions require heavy jacketing materials to be placed about the optical fibers. Although heavy jacket materials serve the purpose of protecting the cables as they are routed through chases and plenums during the installation, their use creates a secondary problem wherein the flexibility of the cables is limited by the stiffness of the jacket. The stiffness of the outer jacket may prevent convenient routing of these cables to the back plane of a cabinet or face panel. Additionally, the large diameters of these heavy jackets may prevent tight radius routing and mechanical mating of these cables to industry standard connectors. If the outer protective jacket is removed to allow more flexible handling of a terminal portion of the cable, there is insufficient physical protection for this terminal portion. Moreover, the inner layers of prior art cables have little or no flame retardancy.

In light of the foregoing, it would be desirable to devise an improved fiber optic cable construction.

SUMMARY

In one aspect, the present invention to provide an improved fiber optic cable that facilitates installation and routing at terminals such as back planes or face panels.

It is another aspect of the present invention provides an improved fiber optic cable that meets flexibility and flammability requirements at termination locations, and in particular alleviates the stresses that arise from heavy, stiff outer jackets.

In yet another aspect, the present invention to provides an efficient method for manufacturing such fiber optic cables and assemblies.

The foregoing aspects are achieved in a fiber optic cable construction generally comprising one or more optical fibers, an inner tube surrounding the optical fibers, a strength member extending along a surface of the inner tube, an inner jacket surrounding the inner tube and strength member, and an outer jacket surrounding the inner jacket without being adhered to the inner jacket such that the outer jacket is easily strippable from the inner jacket. In an exemplary embodiment, each of the inner tube, the inner jacket, and the outer jacket have a generally circular cross-section and are concentric. The inner jacket may be constructed of a flame resistant material, while the outer jacket may be constructed of a flame retardant material. Also, the inner jacket is advantageously constructed of a flexible material while the outer jacket is constructed of a material that is stiffer than the inner jacket. The inner jacket may be constructed of braided glass fibers that are both flexible and flame resistant. The outer jacket is preferably constructed of a polymer that is extruded over the inner jacket without adhering to the weave of the braided fibers.

In an alternative embodiment, a cable assembly is constructed using a plenum cable that originally lacks any inner jacket (braided layer), by stripping a length of the outer jacket away from a terminal portion of the plenum cable to expose the inner tube and strength member, and then threading the inner tube and strength member at the terminal end portion through an inner jacket tubing. The inner jacket tubing may be secured to the outer jacket at a transition joint, e.g., using heat shrink tubing about the transition joint.

The above summary of the present invention is not intended to describe each disclosed embodiment or every implementation of the present invention. The Figures and the detailed description that follows more particularly exemplify illustrative embodiments.

BRIEF DESCRIPTION OF THE DRAWINGS

The present invention may be better understood, and its numerous objects, features, and advantages made apparent to those skilled in the art by referencing the accompanying drawings.

FIG. 3 is a side elevational view of the dual stage fiber optic cable of FIG. 1, with layers removed in a staggered manner to illustrate each component; and FIG. 4 is a perspective view of one embodiment of a plenum cable assembly using a furcated fiber optic cable similar to that of FIG. 1.

The use of the same reference symbols in different drawings indicates similar items.

These figures are idealized, not drawn to scale and are intended for illustrative purposes.

DETAILED DESCRIPTION

Advantages of at least one embodiment of the present invention include an improved cable designed to apply less stress, as compared to conventional cables, when the cable is terminated with an optical connector, to allow (through its diameter and increased flexibility) for easy routing through a torturous path to arrive at the back plane of a cabinet or a face panel, and to be flexible and routable while simultaneously providing for a flame retardant covering.

The present invention provides an improved fiber optic cable that has heavy duty protection of the optical fibers in a plenum or chase, yet allows the stiff outer jacket to be stripped back for greater flexibility in routing to back planes and face panels, and still provides adequate protection to the inner layers of the cabling. It would be further advantageous if the more flexible inner cabling has good flame resistance.

Figure 1:
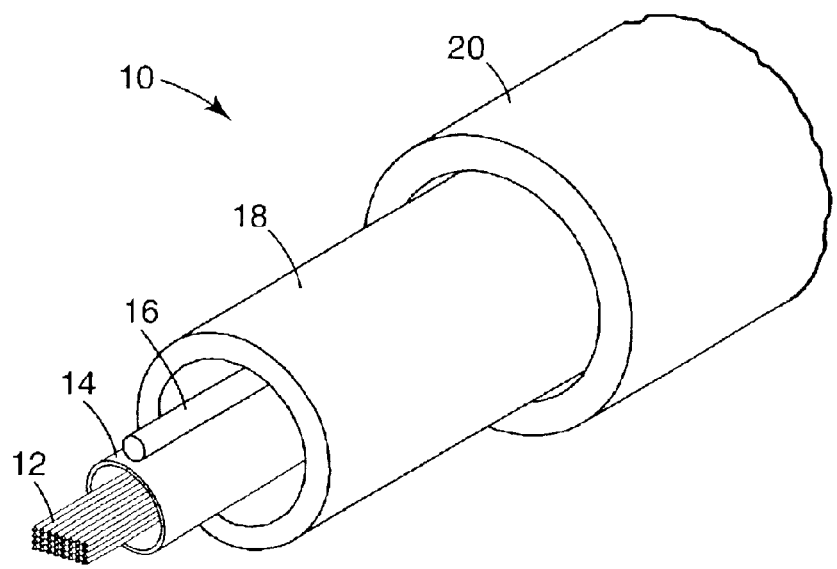
FIG. 1 is a perspective view of an exemplary embodiment of a dual stage fiber optic cable constructed in accordance with the present invention.
Figure 2:
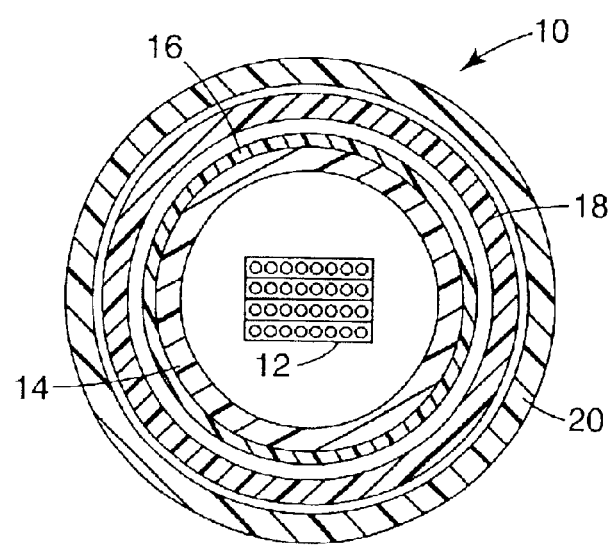
FIG. 2 is a sectional view of the dual stage fiber optic cable of FIG. 1.

With reference now to the figures, and in particular with reference to FIGS. 1–3, there is depicted in several different views one embodiment 10 of a dual stage fiber optic cable constructed in accordance with one aspect of the present invention. Fiber optic cable 10 may be adapted for carrying a single optical fiber core, or multiple fibers, for high-speed communications and data transmission. In the embodiment shown, cable 10 carries a total of 32 fibers, in the form of four fiber ribbons which each have eight fibers embedded in an acrylate matrix, but other configurations can be used as well, such as 4 ribbons having 12 fibers each for a total of 48 fibers. Each fiber has a 125 $\mu$m cladding with a polymer coating that increases the individual fiber diameter to 250 $\mu$m. The fibers 12 are surrounded loosely by an inner tube 14. One or more strength members 16 are located along the outer surface of inner tube 14 (the position of strength members 16 could alternatively be on the inside of inner tube 14). Inner tube 14 and strength members 16 are further surrounded by an inner jacket 18 that is generally concentric with inner tube 14 and an inner jacket loosely surrounding the inner tube and the strength member (see FIG. 2). An outer jacket 20 encases inner jacket 18 and is generally concentric therewith.

Inner tube 14 may be constructed of any durable material, preferably a flexible polymer such as polyvinylidene fluoride (PVDF, e.g., KYNAR). While this material is relatively pliable to facilitate placement and routing of a terminal portion of the cable, it is still sufficiently rigid to maintain the dimensional stability of inner tube 14 (with the generally circular cross-section) so as to allow fibers 12 to remain loosely guided within the tube. In this manner, the fibers have additional clearance to further reduce the chances of any microbends being formed therein while inner tube 14 is curved or bent as the terminal portion of the cable is routed.

Strength members 16 are constructed of a lightweight but high tensile material, preferably aramid fibers (e.g., KEVLAR). There may be only one or two strength members, or there may be a mat or weave of the fibers. While the strength members may be located along either the inner surface or the outer surface of inner tube 14, they are inside inner jacket 18.

Inner jacket 18 is constructed of a flame resistant material, preferably in the form of a mesh or braid to impart greater flexibility. A braided layer made from woven glass fibers is useful as the braid is abrasion resistant and the glass fibers are inflammable. A woven glass braided layer 18 is also easily routed for placement of the terminal portion of the cable. Other materials may be used to form a braided layer, such as aramid fibers, stainless steel fibers, polyimides, etc.

Outer jacket 20 is constructed of any durable material with appropriate flame retardancy as may be required by applicable safety standards. For example, outer jacket 20 may be constructed of a flame retardant polymer such as polyvinyl chloride (PVC), which also provides resistance to smoke evolution. Outer jacket 20 is stiffer than inner jacket 18 and an inner jacket loosely surrounding the inner tube and the strength member (see FIG. 2), because outer jacket 20 is adapted to provide greater mechanical protection to the cable as it routed through, e.g., plenums and chases. It may be desirable for some applications to form outer jacket 20 of a material that is low in halogen.

The heavy outer jacketing materials used with fiber optic cables provide mechanical protection, flame retardancy and smoke containment, but the flexibility of the cables is limited by the stiffness of the outer jacket. This stiffness creates difficulties in placing the end portions of the cables at terminal locations, such as back planes or face panels of cabinets. By way of the present invention, outer jacket 20 may be conveniently stripped back to expose the flexible inner jacket 18 that is more easily routed to back planes and face panels.

The relative stiffness of the inner and outer jackets may be seen by comparing the forces necessary to bend the cable depending upon whether or not the outer jacket is included in the construction, i.e., comparing the flexure of the plenum portion of the cable which includes the outer jacket to the terminal portion of the cable from which the outer jacket has been stripped. These bending forces are similar to those encountered when routing the cable around corners, whether in plenums or at terminal locations. The following measurements were done on two different cables. Cable 1 is a commercially available cable from Corning Cable Systems, LLC, Hickory, N.C. under the following product identification listed on the orange colored cable: "Corning Optical Cable 05-01, 72 MM 50, OFNP (UL) (ETL) OFN FT6 (CSA)T". Cable 2 represents the optical cable of the present invention and is made using a braided glass layer, KEVLAR strength members and a KYNAR (PVDF) inner tube (5.8 mm OD×4 mm ID) Table 1 reflects measurements taken by securing the cables in a cantilevered fashion and applying a single vertical (downward) force F acting at distance of 6 inches from the anchor point (i.e., the length of the beam) to deflect the cable 2.5 inches.

TABLE 1

(L = 6 inches)

| Cable Type | Force (F) required to deflect 2.5 inches |
|---|---|
| Cable 1 | 3.37 # |
| Cable 2 | 0.021 # |

The units for F are in pounds. Table 2 reflects a similar measurement set up but the cable length was 12 inches and the deflection was 5 inches.

TABLE 2

(L = 12 inches)

| Cable Type | Force (F) required to deflect 5 inches |
|---|---|
| Cable 1 | 0.842 # |
| Cable 2 | 0.0053 # |

For each of these sets of measurements, the plenum portion of the cable with the outer jacket is about 160 times stiffer (as defined by the required deflection force) than the terminal portion of the cable which lacks the outer jacket or, conversely, the terminal portion of the cable is about 160 times more flexible. These specific measurements are exemplary. The terminal portion of the cable is preferably at least 100 times more flexible that the outer jacketed cable, and in any event should be at least 10 times more flexible (based on this measurement technique), to ease installation at the terminal locations.

The use of a flexible inner jacket 18 that is also flame resistant addresses the additional safety concerns when the flame retardant outer jacket 20 is stripped away. There are generally different flammability ratings for different uses or locations of a fiber optic cable. For example, one safety standard (from Underwriters Laboratory (UL)) requires an OFN flammability rating of P for chases and plenums in buildings. The R rating applies to risers, while other areas such as cabinets fall under the G rating (general). Test method UL 901 describes the requirements for an OFNP rating, while test method UL 1616 describes the requirements for an OFNR rating. Thus, the outer jacket 20 constructed of PVC has an OFNP rating which is necessary for distribution of the cable within a building, but this rating is not required of the cables at the back planes or face panels. Nevertheless, there is still a desire for some flame resistance at the terminal locations. The use of a braided layer of woven glass fibers for inner jacket 18 is accordingly advantageous due to both the flame resistance and the increased flexibility. Inner jacket 18 is also smaller in diameter than the heavier outer jacket 20, such that it can be terminated with industry standard fiber optic connectors.

While the dimensions of the various components of cable 10 may vary considerably depending upon the application, the following approximate dimensions are exemplary. The 4-ribbon fiber core is about 3.05 mm by about 2.03 mm in cross-section. Inner tube 14 has an inner diameter of about 3.96 mm, and an outer diameter of about 4.75 mm. Braided glass layer 18 has an outer diameter of about 6.2 mm. Outer jacket 20 has an outer diameter of about 7.3 mm. The cable may also be various lengths, e.g., 300 m for indoor distribution.

The cable depicted in FIGS. 1–3 has a single core, that is, when outer jacket 20 is stripped, there is only one terminal end portion of the cable which is further protected by inner jacket 18. The invention is not so limited, however, and other embodiments could break out multiple cores into more than one terminal branch, each branch having its own inner tube 14, strength members 16, and woven glass braid layer 18.

With reference now to FIG. 4, there is depicted a further embodiment of the present invention in the form of a furcated fiber optic cable assembly 30 which has two such branches 32 at the terminal end portions 34 of the cable assembly. Each terminal branch 32 has at its distal end a connector plug 36. In the embodiment shown, the connectors are industry standard connector plugs, such as the Optical Gateway Interface (OGI) connectors marketed by 3M Company, St. Paul, Minn. Each terminal branch is protected by a separate woven glass braid layer 18. The central portion 38 of the cable assembly, which passes through the plenums and risers, includes outer jacket 20. Heat shrink tubing 40 may be used to reinforce the transition joint between plenum portion 38 and terminal portions 34. For this application, the outer diameter of outer jacket 20 is 13.3 mm.

The invention may also be applied to prior art cables which lack the inner jacket 18, by retrofitting the prior art cables with this braided glass layer. The outer jacket of the cable is stripped, and a tubular piece of the braided glass is slid onto the fiber core, that is, the optical fibers, any inner tube and the strength members are threaded through the braided glass tubing. This retrofitting of the cable provides an appropriate transition from the standard inflexible cable to the more flexible terminal cable portions. The transition joint may again be secured using heat shrink tubing.

Cable 10 may be manufactured using fiber optic ribbon cables or other waveguides commonly available in the marketplace. One or more optical waveguides are threaded through a cross-head plastic extrusion die wherein an extruded polymer tube is applied about the ribbon cables. In many instances it is highly desirable to twist the ribbon cables as they are fed through the cross-head die thus providing the ribbon cables with a "lay," and improving the flexibility and routability of the ribbon cables. The extrusion process preferably is of the "tube on" type where the extruded tube is not applied with a pressure that would cause the extruded tube to collapse onto the ribbon cables. The ribbon cables are allowed to move freely within the extruded tube. An alternative to using the "tube on" extrusion process is an extrusion process referred to as vacuum process where the extruded tube is held in intimate contact with the cross-head die orifice via a vacuum, thereby maintaining the extruded polymer in a tube-like form.

The extrusion of the first tube like structure is followed by a braiding operation wherein fiber materials such as NOMEX, KEVLAR, or glass are braided about the first tube-like structure. Inner jacket 18 can be fabricated by weaving or braiding any material that can be drawn or spun into a fiber. The inherent drape of woven or braided materials provides fiber optic cable assemblies that exhibit both flexibility and protection. Strength members are placed in the space between the first tube and the braided outer sheath.

Once the braiding step is complete, the resulting partial cable assembly is next guided through a second cross-head die wherein a second polymer tube is extruded in such a manner that this tube covers the surface of the braided fibers thus providing a protective jacket over the cable assembly. The outer jacket is extruded in such a manner that the outer jacket does not flow into the weave of the braided sheath, to prevent the forming of a bond therebetween. This may be accomplished using a tube on or vacuum process. For example, with the vacuum process, the vacuum holds the outer jacket against the die as it is extruded so it does not collapse around the cable. Alternatively, an intermediate layer such as a tissue or film (e.g., of polyester or polyethylene terephthalate) can be inserted between the inner and outer jackets. The outer jacket is thus easily strippable from the braided sheath without causing damage to the sheath. In certain instances it may be desirable to position strength members between the braided sheath and the outer jacket. This may be in addition to or in lieu of placing strength member between the first extruded tube and the braided sheath.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A fiber optic cable comprising:
   one or more optical fibers;
   an inner tube surrounding said one or more optical fibers;
   a strength member extending along a surface of said inner tube;
   an inner jacket loosely surrounding said inner tube and strength member; and
   an outer jacket loosely surrounding said inner jacket without being adhered to said inner jacket such that said outer jacket is easily strippable from said inner jacket.

2. The fiber optic cable of claim 1 wherein each of said inner tube, said inner jacket, and said outer jacket have a generally circular cross-section and are concentric.

3. The fiber optic cable of claim 1 wherein:
   said an inner jacket is constructed of a flame resistant material; and
   said outer jacket is constructed of a flame retardant material.

4. The fiber optic cable of claim 1 wherein:
   said inner jacket is constructed of a flexible material; and
   said outer jacket is constructed of a material which is stiffer than said inner jacket.

5. The fiber optic cable of claim 1 wherein said inner jacket is constructed of braided fibers.

6. The fiber optic cable of claim 5 wherein said braided fibers are glass fibers.

7. The fiber optic cable of claim 5 wherein said outer jacket is constructed of a polymer which is extruded over said inner jacket without adhering to a weave of said braided fibers.

8. The fiber optic cable of claim 1, further comprising a fiber optic connector disposed to a terminal end of said inner jacket.

9. A fiber optic cable comprising:
   one or more optical fibers;
   an inner tube surrounding said one or more optical fibers;
   a strength member extending along a surface of said inner tube;
   an inner jacket loosely surrounding said inner tube and strength member, said inner jacket being constructed of a flexible material; and an outer jacket loosely surrounding said inner jacket, said outer jacket being constructed of a material which is stiffer than said inner jacket.

10. The fiber optic cable of claim 9 wherein each of said inner tube, said inner jacket, and said outer jacket have a generally circular cross-section and are concentric.

11. The fiber optic cable of claim 9 wherein said outer jacket surrounds said inner jacket without being adhered to said inner jacket such that said outer jacket is easily strippable from said inner jacket.

12. The fiber optic cable of claim 9 wherein:
said an inner jacket is constructed of a flame resistant material; and
said outer jacket is constructed of a flame retardant material.

13. The fiber optic cable of claim 9 wherein a plenum portion of the cable having said one or more optical fibers, said inner tube, said strength member, said inner jacket and said outer jacket is at least 100 times stiffer than a terminal portion of the cable having said one or more optical fibers, said inner tube, said strength member, and said inner jacket but lacking said outer jacket, based on a cantilevered deflection force.

14. The fiber optic cable of claim 13 wherein said inner jacket is constructed of braided fibers.

15. The fiber optic cable of claim 13 wherein said outer jacket is an extruded polymer.

16. The fiber optic cable of claim 9 further comprising a fiber optic connector disposed to a terminal end of said inner jacket.

17. A fiber optic cable comprising:
one or more optical fibers;
an inner tube surrounding said one or more optical fibers;
a strength member extending along a surface of said inner tube;
an inner jacket loosely surrounding said inner tube and strength member, said inner jacket being constructed of a flame resistant material; and
an outer jacket loosely surrounding said inner jacks said outer jacket being constructed of a flame retardant material.

18. The fiber optic cable of claim 17 wherein each of said inner tube, said inner jacket, and said outer jacket have a generally circular cross-section and are concentric.

19. The fiber optic cable of claim 17 wherein said outer jacket surrounds said inner jacket without being adhered to said inner jacket such that said outer jacket is easily strippable from said inner jacket.

20. The fiber optic cable of claim 17 wherein:
said inner jacket is constructed of a flexible material; and
said outer jacket is constructed of a material which is stiffer than said inner jacket.

21. The fiber optic cable of claim 17 wherein said outer jacket is constructed of a polymer material providing resistance to smoke evolution.

22. The fiber optic cable of claim 17 wherein said inner jacket is constructed of braided fibers.

23. The fiber optic cable of claim 22 wherein said braided fibers are glass fibers.

24. The fiber optic cable of claim 17 further comprising a fiber optic connector disposed to a terminal end of said inner jacket.

25. A fiber optic cable assembly comprising:
one or more optical fibers;
an inner tube surrounding said one or more optical fibers;
a strength member extending along a surface of said inner tube;
an inner jacket loosely surrounding said inner tube and strength member along a terminal portion of the cable assembly, said inner jacket being constructed of a flexible material; and
an outer jacket loosely surrounding said inner tube and strength member along a plenum portion of the cable assembly which lacks said inner jacket, said outer jacket being constructed of a material which is stiffer than said inner jacket.

26. The fiber optic cable assembly of claim 25 wherein each of said inner tube, said inner jacket, and said outer jacket have a generally circular cross-section and are concentric.

27. The fiber optic cable assembly of claim 25 wherein:
said an inner jacket is constructed of a flame resistant material; and
said outer jacket is constructed of a flame retardant material.

28. The fiber optic cable assembly of claim 25 wherein an end of said inner jacket is secured to an end of said outer jacket at a transition joint.

29. The fiber optic cable assembly of claim 25 wherein said transition joint includes heat shrink tubing.

30. The fiber optic cable of claim 25 further comprising a fiber optic connector disposed to a terminal of said inner jacket.

31. A fiber optic cable comprising:
one or more optical fibers;
an inner tube surrounding said one or more optical fibers;
a strength member extending along a surface of said inner tube;
an inner jacket loosely surrounding said inner tube and strength member, said inner jacket being constructed of a flexible, flame resistant material; and
an outer jacket loosely surrounding said inner jacket without being adhered to said inner jacket such that said outer jacket is easily strippable from said inner jacket, said outer jacket being constructed of a flame retardant material which is stiffer than said inner jacket.

32. The fiber optic cable of claim 31 wherein each of said inner tube, said inner jacket, and said outer jacket have a generally circular cross-section and are concentric.

33. The fiber optic cable of claim 31 wherein said inner jacket is constructed of braided glass fibers.

34. The fiber optic cable of claim 31 further comprising a fiber optic connector disposed to a terminal end of said inner jacket.

35. A method of preparing a terminal end portion of a fiber optic cable having one or more optical fibers, an inner tube surrounding the one or more optical fibers, a strength member extending along a surface of the inner tube, and an outer jacket surrounding the inner tube, comprising the steps of:
striping a length of the outer jacket from the terminal end portion to expose the inner tube and strength member;
threading the inner tube and strength member at the terminal end portion through an inner jacket tubing such that the inner tube and strength member are loosely surrounded by the inner jacket tubing, the inner jacket tubing being constructed of a flame resistant, flexible material; and
securing the inner jacket tubing to the outer jacket at a transition joint.

36. The method of claim 35 wherein said securing step includes the step of applying heat shrink tubing about the transition joint.

37. The method of claim 35 further comprising the step of attaching a fiber optic connector to a terminal end of the inner jacket tubing.

38. A method of manufacturing a fiber optic cable, comprising the steps of:

threading one or more optical waveguides through an extrusion die while extruding a polymeric tube about the one or more optical waveguides;

braiding fiber materials loosely about the polymeric tube to form a braided layer;

placing a strength member along a surface of the braided layer, the strength member, braided layer, polymeric tube and one or more optical waveguides forming a partial cable assembly;

guiding the partial cable assembly through another extrusion die while extending an outer polymeric jacket loosely about the braided layer in such a manner that the outer polymeric jacket does not flow into a weave of the braided layer.

39. The method of claim 38 wherein the one or more optical fiber waveguides are twisted as they are fed through the extrusion die.

40. The method of claim 38 wherein said guiding step uses a vacuum process to hold the outer polymeric jacket against the extrusion die as the outer polymeric jacket is extruded so the outer jacket does not collapse around the partial cable assembly.

* * * * *

UNITED STATES PATENT AND TRADEMARK OFFICE
CERTIFICATE OF CORRECTION

PATENT NO. : 6,839,494 B2
DATED : January 4, 2005
INVENTOR(S) : Clatanoff, William J.

It is certified that error appears in the above-identified patent and that said Letters Patent is hereby corrected as shown below:

Title page,
Item [56], References Cited, U.S. PATENT DOCUMENTS, please add the following references:
-- 5,566,266    10/1/1996    Nave et al.
   6,301,413 B1 10/09/2001    Bringuier
FOREIGN PATENT DOCUMENTS, please add the following reference:
EP 1 014 135 A1    06/28/2000    EP --

Column 2,
Lines 58-59, delete "predominantly" and insert -- predominately --

Column 5,
Lines 56 and 58, delete "Coming" and insert -- Corning -- therefor.

Column 9,
Line 40, delete "jacks" and insert -- jacket, -- therefor.

Column 10,
Line 28, after "terminal" insert -- end --.
Line 58, delete "striping"and insert -- stripping -- therefor.

Column 12,
Line 2, delete "extending" and insert -- extruding -- therefor.
Line 13, after "outer" insert -- polymeric --.

Signed and Sealed this

Twenty-eighth Day of June, 2005

JON W. DUDAS
*Director of the United States Patent and Trademark Office*